United States Patent
Niemi et al.

(10) Patent No.: US 12,532,247 B2
(45) Date of Patent: Jan. 20, 2026

(54) UE HANDLING OF FORBIDDEN TAI LIST INFORMATION ELEMENTS IN EPS SERVICE ACCEPT IN MOBILE COMMUNICATIONS

(71) Applicant: MediaTek Singapore Pte. Ltd., Singapore (SG)

(72) Inventors: Marko Niemi, Oulu (FI); Yuan-Chieh Lin, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 362 days.

(21) Appl. No.: 18/123,310

(22) Filed: Mar. 19, 2023

(65) Prior Publication Data

US 2023/0388905 A1 Nov. 30, 2023

Related U.S. Application Data (60) Provisional application No. 63/345,451, filed on May 25, 2022.

(51) Int. Cl.
*H04W 48/14* (2009.01)
*H04W 48/16* (2009.01)
*H04W 84/04* (2009.01)

(52) U.S. Cl.
CPC ........... *H04W 48/14* (2013.01); *H04W 48/16* (2013.01); *H04W 84/042* (2013.01)

(58) Field of Classification Search
CPC ............................... H04W 48/14; H04W 48/16
USPC .......................................................... 370/329
See application file for complete search history.

(56) References Cited

U.S. PATENT DOCUMENTS

| 11,956,748 B2* | 4/2024 | Hathiramani ......... H04W 60/04 |
| 2018/0007621 A1* | 1/2018 | Kim ...................... H04W 76/23 |
| 2019/0223246 A1 | 7/2019 | Huang-Fu et al. |
| 2020/0323020 A1* | 10/2020 | Liu ....................... H04W 80/10 |
| 2021/0144539 A1 | 5/2021 | Edge et al. |

(Continued)

FOREIGN PATENT DOCUMENTS

TW 201944843 A 11/2019

OTHER PUBLICATIONS

European Patent Office, Extended European Search Report in European Patent Application No. 23168708.8, Oct. 17, 2023.

(Continued)

*Primary Examiner* — Faisal Choudhury
(74) *Attorney, Agent, or Firm* — Andy M. Han; Han IP PLLC (57) ABSTRACT

Examples pertaining to user equipment (UE) handling of forbidden tracking area identifier (TAI) list information elements (IEs) in an Evolved Packet System (EPS) SERVICE ACCEPT message in mobile communications are described. A user equipment (UE) transmits a CONTROL PLANE SERVICE REQUEST message to an EPS network node of a wireless network. In response, the UE receives a SERVICE ACCEPT message from the EPS network node. The SERVICE ACCEPT message includes either or both of the following: (i) one or more forbidden tracking area identifiers (TAIs) for a list of "forbidden tracking areas for roaming" information element (IE); and (ii) one or more forbidden TAIs for a list of "forbidden tracking areas for regional provision of service" IE.

17 Claims, 4 Drawing Sheets

(56) References Cited

U.S. PATENT DOCUMENTS

2022/0225105 A1* 7/2022 Balasubramanian ........................ H04W 12/63
2023/0052177 A1* 2/2023 Edge .................. H04B 7/18528

OTHER PUBLICATIONS

Blackberry UK Ltd et al., "Correcting RAI description", C1-196703, 3GPP TSG-CT1 Meeting #120, Portoroz, Slovenia, Oct. 7-11, 2019.
Taiwan Intellectual Property Office, Office Action in Taiwan Patent Application No. 112118145, Feb. 6, 2024.

* cited by examiner

UE HANDLING OF FORBIDDEN TAI LIST INFORMATION ELEMENTS IN EPS SERVICE ACCEPT IN MOBILE COMMUNICATIONS

CROSS REFERENCE TO RELATED PATENT APPLICATION(S)

The present disclosure is part of a non-provisional application claiming the priority benefit of U.S. Patent Application No. 63/345,451, filed 25 May 2022, the content of which herein being incorporated by reference in its entirety.

TECHNICAL FIELD

The present disclosure is generally related to mobile communications and, more particularly, to user equipment (UE) handling of forbidden tracking area identifier (TAI) list information elements (IEs) in an Evolved Packet System (EPS) SERVICE ACCEPT message in mobile communications.

BACKGROUND

Unless otherwise indicated herein, approaches described in this section are not prior art to the claims listed below and are not admitted as prior art by inclusion in this section.

In wireless communications, such as mobile communications under the 3$^{rd}$ Generation Partnership Project (3GPP) standards including 5th Generation (5G) New Radio (NR) and 4th Generation (4G) EPS, although a Mobility Management Entity (MME) in an EPS network apparatus of a network does not always send a SERVICE ACCEPT message to a UE, a service request procedure can still be treated as completed (e.g., after a SECURITY MODE COMMAND message or an indication from the lower layers that the user plane radio bearers are set up). In satellite Evolved Universal Mobile Telecommunications System (UMTS) Radio Access Network (E-UTRAN) access, the network may need to provide the UE with forbidden TAI list(s) even if the service request can be completed successfully. This can happen if a cell on which the UE is camped is broadcasting multiple tracking area codes (TACs) for a selected/registered public land mobile network (PLMN) and the network detects that some TAIs (each of which comprising a respective TAC plus a respective PLMN identifier (ID)) are forbidden (e.g., for roaming or for regional provision of service) for the UE while other broadcast TAIs are not forbidden.

With respect to the service request procedure, the UE needs to invoke the service request procedure when one or more conditions exists. One condition is that the UE, in an EPS Mobility Management (EMM)-IDLE mode, receives from the network a paging request using a Serving Temporary Mobility Subscriber Identity (S-TMSI) with a core network (CN) domain indicator set to "PS" (packet switching). As an implementation option, the multi-Universal Subscriber Identity Module (MUSIM) UE is allowed to not respond to paging based on the information available in the paging message (e.g., voice service indication). Another condition is that the UE, in the EMM-IDLE mode, has pending user data to be sent. A further condition is that the UE, in the EMM-IDLE mode, has uplink signaling pending. However, in view of the above, one issue is that the network should have a way to provide forbidden TAI list IE(s) to the UE when the service request procedure is successfully completed in case it has to provide forbidden TAI list IE(s) to the UE. Another issue is that the UE may lack of criteria to treat or handle forbidden TAI list IE(s) when received in a SERVICE ACCEPT message from the network. Therefore, there is a need for a solution of UE handling of forbidden TAI list IEs in an EPS SERVICE ACCEPT message in mobile communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

One objective of the present disclosure is propose schemes, concepts, designs, systems, methods and apparatus pertaining to UE handling of forbidden TAI list IEs in an EPS SERVICE ACCEPT message in mobile communications. It is believed that the above-described issue would be avoided or otherwise alleviated by implementing one or more of the proposed schemes described herein.

In one aspect, a method may involve a processor of an apparatus (e.g., UE) transmitting a CONTROL PLANE SERVICE REQUEST message to an EPS network node of a wireless network. In response, the method may also involve the processor receiving a SERVICE ACCEPT message from the EPS network node. The SERVICE ACCEPT message may include either or both of the following: (i) one or more forbidden TAIs for a list of "forbidden tracking areas for roaming" IE; and (ii) one or more forbidden TAIs for a list of "forbidden tracking areas for regional provision of service" IE.

In another aspect, a method may involve a processor of an apparatus (e.g., UE) transmitting a CONTROL PLANE SERVICE REQUEST message to an EPS network node of a wireless network. In response, the method may also involve the processor receiving a message from the EPS network node during a service procedure. The message may include either or both of the following: (i) a list of "forbidden tracking areas for roaming"; and (ii) a list of "forbidden tracking areas for regional provision of service".

In yet another aspect, an apparatus may include a transceiver and a processor coupled to the transceiver. The transceiver may be configured to communicate wirelessly. The processor may transmit, via the transceiver, a CONTROL PLANE SERVICE REQUEST message to an EPS network node of a wireless network. In response, the processor may receive, via the transceiver, a SERVICE ACCEPT message from the EPS network node responsive to the transmitting. The SERVICE ACCEPT message may include either or both of the following: (i) one or more forbidden TAIs for a list of "forbidden tracking areas for roaming" IE; and (ii) one or more forbidden TAIs for a list of "forbidden tracking areas for regional provision of service" IE.

In still another aspect, an apparatus may include a transceiver and a processor coupled to the transceiver. The transceiver may be configured to communicate wirelessly. The processor may transmit, via the transceiver, a CONTROL PLANE SERVICE REQUEST message to an EPS network node of a wireless network. In response, the processor may receive, via the transceiver, a message from the EPS network node during a service procedure. The message may include either or both of the following: (i) a list of "forbidden tracking areas for roaming"; and (ii) a list of "forbidden tracking areas for regional provision of service".

It is noteworthy that, although description provided herein may be in the context of certain radio access technologies, networks and network topologies such as $5^{th}$ Generation System (5GS) and 4G EPS mobile networking, the proposed concepts, schemes and any variation(s)/derivative(s) thereof may be implemented in, for and by other types of wireless and wired communication technologies, networks and network topologies such as, for example and without limitation, Ethernet, Universal Terrestrial Radio Access Network (UTRAN), E-UTRAN, Global System for Mobile communications (GSM), General Packet Radio Service (GPRS)/ Enhanced Data rates for Global Evolution (EDGE) Radio Access Network (GERAN), Long-Term Evolution (LTE), LTE-Advanced, LTE-Advanced Pro, IoT, Industrial IoT (IIoT), Narrow Band Internet of Things (NB-IoT), and any future-developed networking technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to UE handling of forbidden TAI list IEs in an EPS SERVICE ACCEPT message in mobile communications. According to the present disclosure, a number of possible solutions may be implemented separately or jointly. That is, although these possible solutions may be described below separately, two or more of these possible solutions may be implemented in one combination or another.

Figure 1:
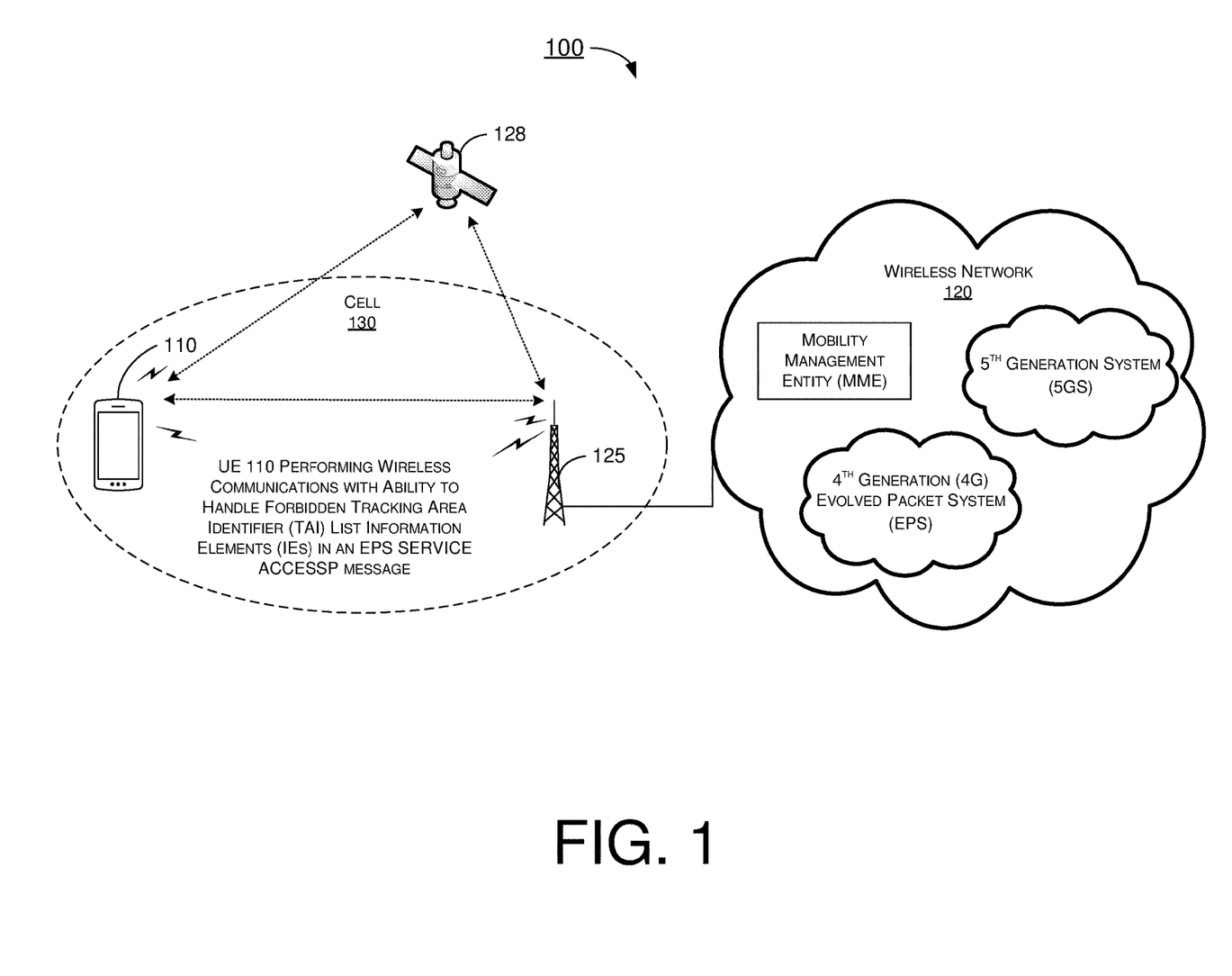
FIG. 1 is a diagram of an example network environment in which various solutions and schemes in accordance with the present disclosure may be implemented.
Figure 2:
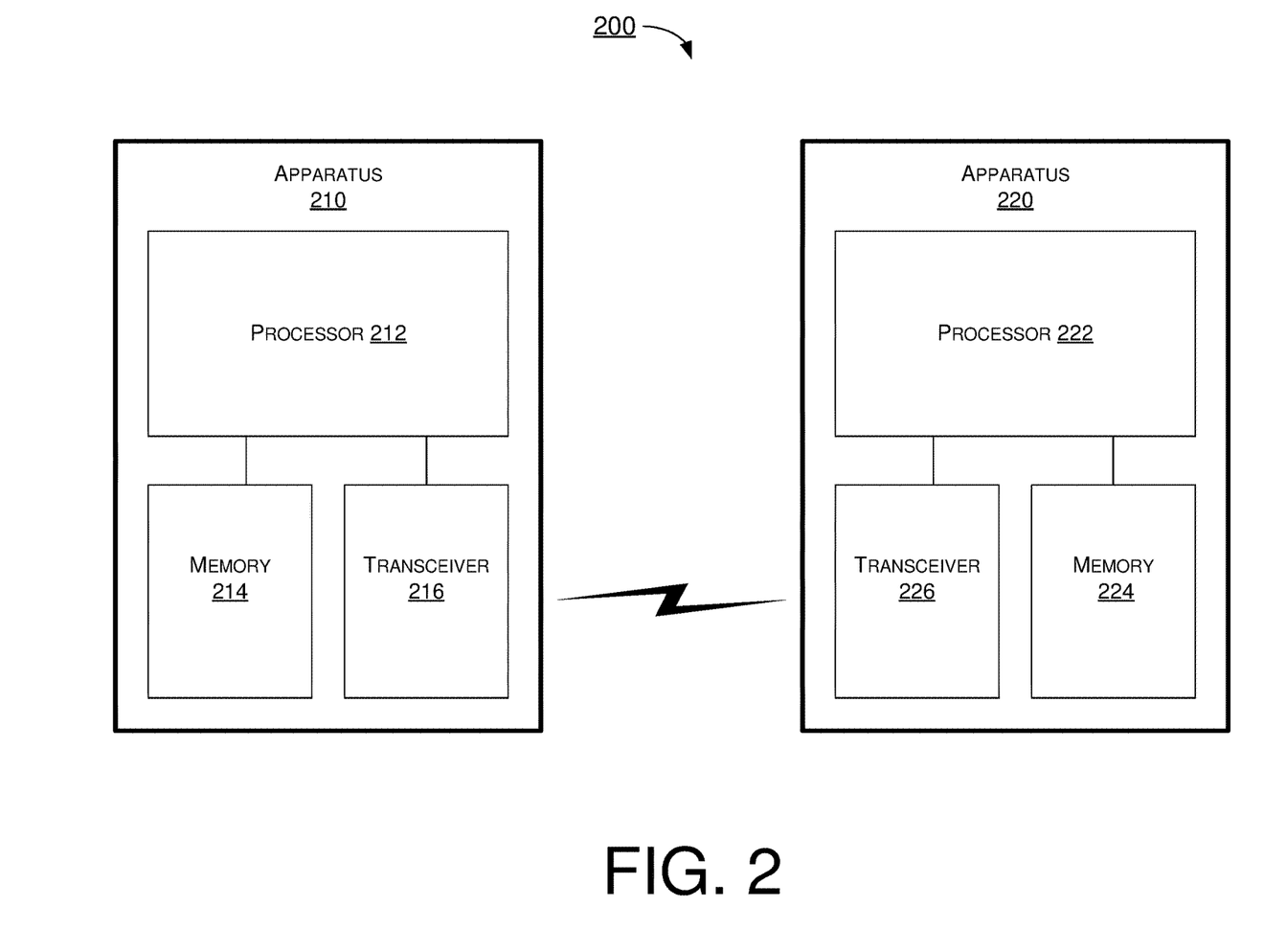
FIG. 2 is a block diagram of an example communication system in accordance with an implementation of the present disclosure.
Figure 3:
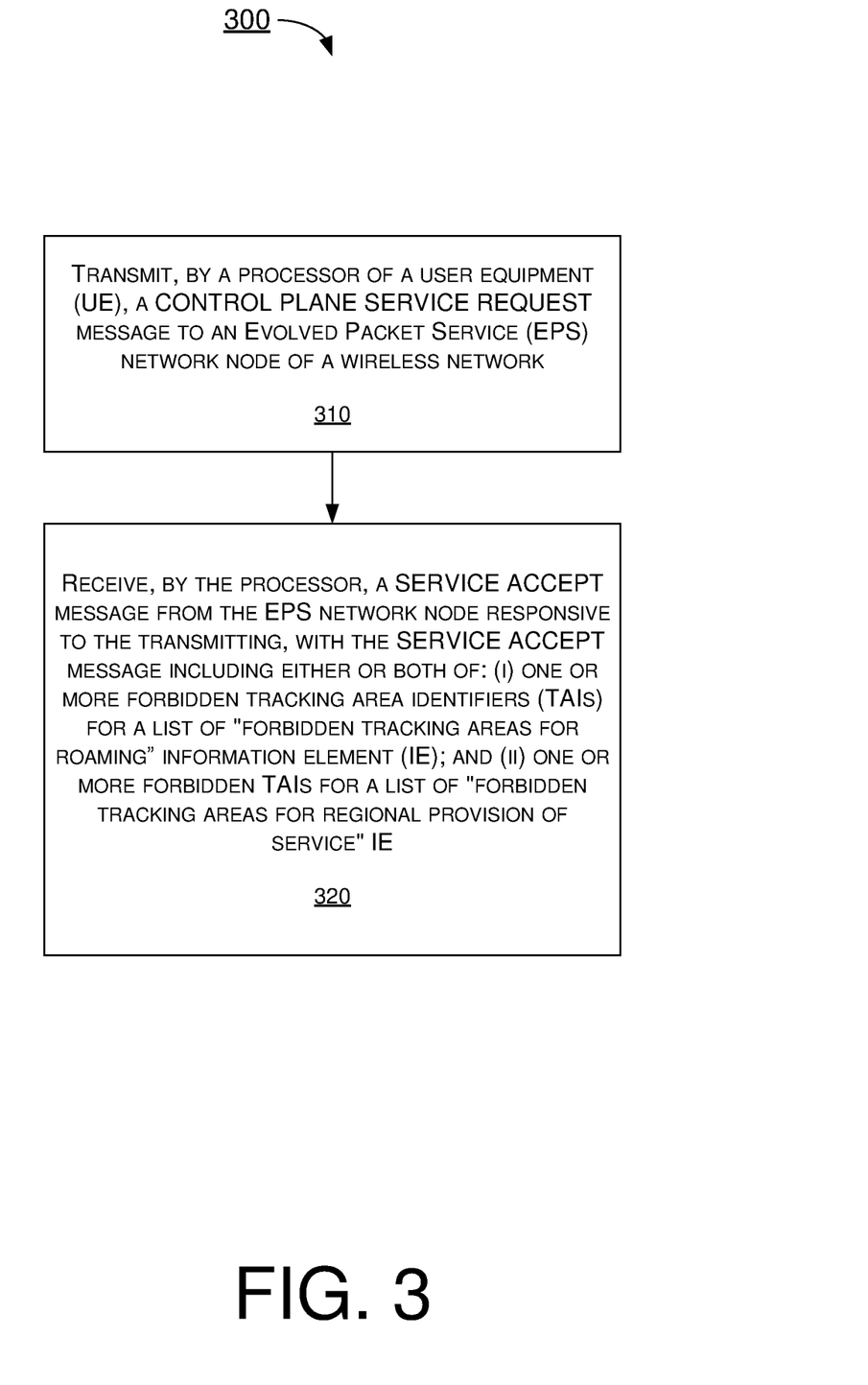
FIG. 3 is a flowchart of an example process in accordance with an implementation of the present disclosure.
Figure 4:
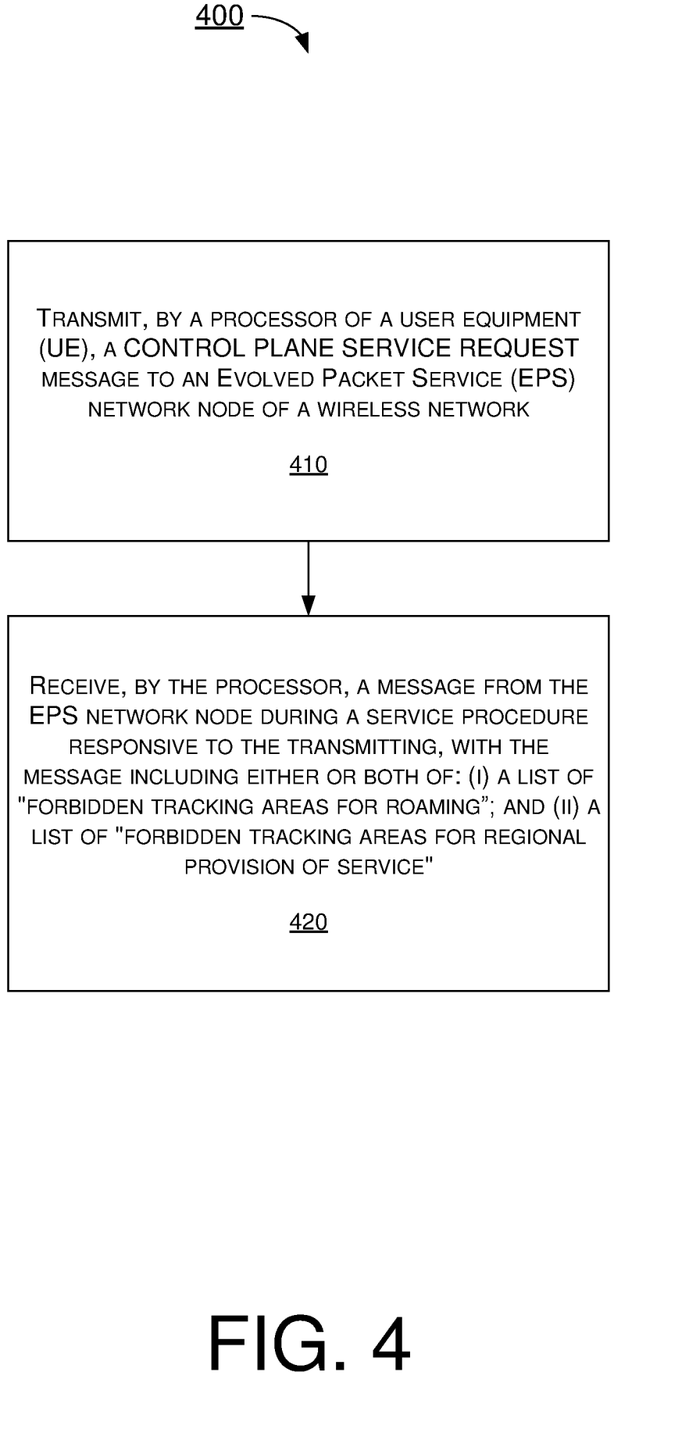
FIG. 4 is a flowchart of another example process in accordance with an implementation of the present disclosure.

FIG. 1 illustrates an example network environment 100 in which various solutions and schemes in accordance with the present disclosure may be implemented. FIG. 2~FIG. 4 illustrate examples of implementation of various proposed schemes in network environment 100 in accordance with the present disclosure. The following description of various proposed schemes is provided with reference to FIG. 1~FIG. 4.

Referring to FIG. 1, network environment 100 may involve a UE 110 and a wireless network 120, which may include a $5^{th}$ Generation System (5GS) (and, optionally, an EPS). Depending on channel condition, availability and/or other factor(s), UE 110 may be in wireless communication with wireless network 120 via one or more terrestrial network nodes (e.g., base station(s) such as eNB, gNB and/or transmission/reception point (TRP)) and/or one or more non-terrestrial network nodes (e.g., satellite(s)). For simplicity in illustration and without limiting the scope of the present disclosure, UE 110 may be associated with or otherwise in communication with a cell 130 corresponding to a terrestrial network node 125 (e.g., gNB, eNB or TRP) and/or a non-terrestrial network node 128 (e.g., satellite) of wireless network 120. In network environment 100, UE 110 and wireless network 120 may implement various schemes pertaining to UE handling of forbidden TAI list IEs in an EPS SERVICE ACCEPT message in mobile communications in accordance with the present disclosure, as described below. It is noteworthy that, while the various proposed schemes may be individually or separately described below, in actual implementations each of the proposed schemes may be utilized individually or separately. Alternatively, some or all of the proposed schemes may be utilized jointly.

Under a first proposed scheme in accordance with the present disclosure, wireless network 120 may include one or more lists in a message other than a SERVICE ACCEPT/ REJECT message transmitted to and received by UE 110 during a service procedure (e.g., in a SECURITY MODE COMMAND message). The one or more lists may include, for example, a list of "forbidden tracking areas for roaming" and/or a list of "forbidden tracking areas for regional provision of service." Under the proposed scheme, in case that, in a message other than SERVICE ACCEPT/REJECT message, UE 110 receives during a service procedure (e.g., in the SECURITY MODE COMMAND message) one or more forbidden TAIs for a list of "forbidden tracking areas for roaming" in the message and in case that UE 110 is operating in a satellite E-UTRAN access, UE 110 may store the TAI(s) included in the message into the list of "forbidden tracking areas for roaming" if not already stored. Moreover, UE 110 may remove the TAI(s) from a stored TAI list (if present). Under the proposed scheme, in case that, in a message other than SERVICE ACCEPT/REJECT message, UE 110 receives during a service procedure (e.g., in the SECURITY MODE COMMAND message) one or more forbidden TAIs for a list of "forbidden tracking areas for regional provision of service" in the message and in case that UE 110 is operating in the satellite E-UTRAN access, UE 110 may store the TAI(s) included in the message into the list of "forbidden tracking areas for regional provision of service" if not already stored. Moreover, UE 110 may remove the TAI(s) from the stored TAI list (if present).

Under a second proposed scheme in accordance with the present disclosure, UE 110 may use EPS services with a control plane Cellular Internet of Things (CIoT) EPS optimization. For instance, upon receipt of a CONTROL PLANE SERVICE REQUEST message with a control plane service type indicating "mobile terminating request", after completion of an EMM common procedures a Mobility Management Entity (MME) of wireless network 120 may send a SERVICE ACCEPT message in case that at least one of a number of conditions is satisfied. A first condition may be that the MME needs to perform an EPS bearer context status synchronization for either: (i) an EPS bearer context associated with a control plane only indication; or (ii) an EPS bearer context not associated with the control plane only indication when there is no downlink user data pending to be delivered via the user plane and UE 110 did not set an "active" flag in a control plane service type IE to 1. A second condition may be that a control plane data backoff time for UE 110 is stored in the MME and the MME decides to deactivate congestion control for transport of user data via the control plane. A third condition may be that the MME needs to provide UE 110 with one or more forbidden TAIs for the list of "forbidden tracking areas for roaming" IE or one or more forbidden TAIs for the list of "forbidden tracking areas for regional provision of service" IE, or for both IEs.

Under the second proposed scheme, the MME may perform one or more additional operations. For instance, the MME may initiate transport of user data via the control plane procedure or any other NAS signaling procedure. Alternatively, or additionally, if supported by UE 110 and required by wireless network 120, the MME may initiate the setup of the user plane radio bearer(s). Alternatively, or additionally, the MME may send a NAS signaling message not related to an EMM common procedure to UE 110 in case of existing pending downlink signaling.

Under a third proposed scheme in accordance with the present disclosure, upon receipt of a CONTROL PLANE SERVICE REQUEST message with a control plane service type indicating "mobile originating request" and after completion of an EMM common procedures, if any, the MME may send a SERVICE ACCEPT message in case that the MME needs to provide UE 110 with one or more forbidden TAIs for the list of "forbidden tracking areas for roaming" IE or one or more forbidden TAIs for the list of "forbidden tracking areas for regional provision of service" IE, or for both IEs, or in case that the MME needs to perform an EPS bearer context status synchronization. For instance, the MME may send the SERVICE ACCEPT message for an EPS bearer context associated with a control plane only indication. Alternatively, the MME may send the SERVICE ACCEPT message for an EPS bearer context not associated with the control plane only indication when there is no downlink user data pending to be delivered via the user plane and UE 110 did not set an "active" flag in a control plane service type IE to 1., there is no downlink user data pending to be delivered via the user plane, and the UE did not set the "active" flag in the Control plane service type IE to 1, Under the third proposed scheme, the MME may perform one or more additional operations. For instance, the MME may initiate release of the NAS signaling connection upon receipt of an indication from an EPS Session Management (ESM) layer, unless the MME has additional downlink user data or signaling pending. Alternatively, or additionally, the MME may initiate the setup of the user plane radio bearer(s), if downlink user data is pending to be delivered via the user plane or UE 110 has set the "active" flag in the control plane service type IE to 1. Alternatively, or additionally, the MME may send an ESM DATA TRANSPORT message to UE 110, if downlink user data is pending to be delivered via the control plane. Alternatively, or additionally, the MME may send a NAS signaling message not related to an EMM common procedure to UE 110 if downlink signaling is pending. Alternatively, or additionally, the MME may send a SERVICE ACCEPT message to complete the service request procedure, if no NAS security mode control procedure was initiated and if the MME did not send a SERVICE ACCEPT message as specified above to perform an EPS bearer context status synchronization and if the MME did not initiate any of the procedures specified above. It is noteworthy that the MME may initiate the setup of the user plane radio bearer(s) if the MME decides to activate the congestion control for transport of user data via the control plane.

Under a fourth proposed scheme in accordance with the present disclosure, upon receipt of a CONTROL PLANE SERVICE REQUEST message with a control plane service type indicating "mobile originating request" and an "active" flag in a control plane service type IE set to 1, the MME may initiate the setup of the user plane radio bearer(s) for all active EPS bearer contexts of SGi packet data network (PDN) connections that are established without the control plane only indication in case that the MME accepts the request. Alternatively, upon receipt of a CONTROL PLANE SERVICE REQUEST message with a control plane service type indicating "mobile originating request" and an "active" flag in a control plane service type IE set to 1, the MME may send a SERVICE ACCEPT message to complete the service request procedure in case that the MME does not accept the request. It is noteworthy that the MME may take into account the maximum number of user plane radio bearers supported by UE 110, in addition to local policies and the preferred CIoT network behavior of UE 110 when deciding whether to accept the request to establish user plane bearer(s). In case that the MME accepts the request, all SGi PDN connections may be considered as established without a control plane only indication. It is also noteworthy that, a UE in the NB-S1 mode may support a maximum of two user plane radio bearers.

Under a fifth proposed scheme in accordance with the present disclosure, upon receipt of a CONTROL PLANE SERVICE REQUEST message with a control plane service type indicating "mobile originating request" and without an ESM message container IE, the MME may proceed in a certain way after completion of EMM common procedures, if any. For instance, in case that the MME needs to perform an EPS bearer context status synchronization either for of an EPS bearer context associated with a control plane only indication or for an EPS bearer context not associated with a control plane only indication with no downlink user data pending to be delivered via the user plane, the MME may send a SERVICE ACCEPT message.

Under the fifth proposed scheme, the MME may perform one or more additional operations. For instance, the MME may initiate the setup of the user plane radio bearer(s), if downlink user data is pending to be delivered via the user plane. Alternatively, or additionally, the MME may send an ESM DATA TRANSPORT message to UE 110, if downlink user data is pending to be delivered via the control plane. Alternatively, or additionally, the MME may send a NAS signaling message not related to an EMM common procedure to UE 110, if downlink signaling is pending. Alternatively, or additionally, the MME may send a SERVICE ACCEPT message to complete the service request procedure, if no NAS security mode control procedure was initiated, if the MME did not send a SERVICE ACCEPT message as specified above to perform an EPS bearer context status synchronization, and the MME did not initiate any of the procedures specified above.

Under a sixth proposed scheme in accordance with the present disclosure, in case that a MUSIM UE (e.g., UE 110) does not include a Paging restriction IE in a CONTROL PLANE SERVICE REQUEST message, the MME may delete any stored paging restriction for that UE and stop restricting paging.

Under a seventh proposed scheme in accordance with the present disclosure, when the MUSIM UE (e.g., UE 110) sets a request type to "NAS signaling connection release" or to "Rejection of paging" in a UE request type IE in a CONTROL PLANE SERVICE REQUEST message and if the UE requests restriction of paging by including a Paging restriction IE, the MME may, in case that the MME accepts the paging restriction, include an EPS additional request result IE in a SERVICE ACCEPT message and set a Paging restriction decision to "paging restriction is accepted." The MME may also store the paging restriction of the UE and enforce these restrictions in the paging procedure. Alternatively, in case that the MME rejects the paging restriction, the MME may include the EPS additional request result IE in the SERVICE ACCEPT message and set the Paging restriction decision to "paging restriction is rejected." The MME may also discard the received paging restriction. Moreover, the MME may delete any stored paging restriction for the UE and stop restricting paging. Furthermore, the MME may initiate the release of the NAS signaling connection after the completion of the service request procedure. In NB-S1 mode, under some of the proposed schemes described above, in case that the MME needs to initiate the setup of user plane radio bearer(s), the MME may check if UE 110 can support the establishment of additional user plane radio bearer based on the multiple data radio bearer (DRB) support indicated by UE 110 in a UE network capability IE.

Under some of the proposed schemes described above, in case that an EPS bearer context status IE is included in the CONTROL PLANE SERVICE REQUEST message, wireless network 120 may deactivate all those EPS bearer contexts locally (without peer-to-peer signaling between wireless network 120 and UE 110) which are active on the network side but are indicated by UE 110 as being inactive. In case that a default EPS bearer context is marked as inactive in the EPS bearer context status IE included in the CONTROL PLANE SERVICE REQUEST message, and in case that this default bearer is not associated with a last PDN connection of UE 110 in the MME, the MME may locally deactivate all EPS bearer contexts associated to the PDN connection with the default EPS bearer context without peer-to-peer ESM signaling to UE 110. In case that the default bearer is associated with the last remaining PDN connection of UE 110 in the MME, and in case that an EMM-REGISTERED without PDN connection is supported by UE 110 and the MME, the MME may locally deactivate all EPS bearer contexts associated to the PDN connection with the default EPS bearer context without peer-to-peer ESM signaling to UE 110.

Under an eighth proposed scheme in accordance with the present disclosure, in case that the EPS bearer context status IE is included in the CONTROL PLANE SERVICE REQUEST and the MME decides to respond with a SERVICE ACCEPT message, the MME may include an EPS bearer context status IE, indicating which EPS bearer contexts are active in the MME, except for the case when no EPS bearer context exists on the network side. Additionally, in case that the MME needs to initiate an EPS bearer context status synchronization, the MME may include an EPS bearer context status IE in the SERVICE ACCEPT message also if no EPS bearer context status IE was included in the CONTROL PLANE SERVICE REQUEST message. Moreover, in case that the MME sends a SERVICE ACCEPT message upon receipt of the CONTROL PLANE SERVICE REQUEST message piggybacked with the ESM DATA TRANSPORT message, the MME may include a T3448 value IE in the SERVICE ACCEPT message in case that one or more conditions is/are met. One of such condition may be that a Release assistance indication IE is set to "No further uplink and no further downlink data transmission subsequent to the uplink data transmission is expected" in the message. Another condition may be that UE 110 has indicated support for the control plane data backoff timer. Yet another condition may be that the MME decides to activate the congestion control for transport of user data via the control plane. Under the proposed scheme, in case that the MME sends a SERVICE ACCEPT message and decides to deactivate congestion control for transport of user data via the control plane, the MME may delete the stored control plane data backoff time for the UE. Moreover, the MME may not include the timer T3448 value IE in the SERVICE ACCEPT message.

Under some of the proposed schemes described above, in case that an EPS bearer context status IE is included in a CONTROL PLANE SERVICE REQUEST message or in case that the MME needs to initiate an EPS bearer context status synchronization, the MME may consider the service request procedure successfully completed when it sends the SERVICE ACCEPT message. In case that the EPS bearer context status IE is not included in the CONTROL PLANE SERVICE REQUEST message and the MME does not need to initiate an EPS bearer context status synchronization, the MME may consider the service request procedure successfully completed in one or more situations. A first situation may be when the MME successfully completes a NAS security mode control procedure. A second situation may be when the MME receives an indication from the lower layer that the user plane is setup, if radio bearer establishment is required. A third situation may upon receipt of the CONTROL PLANE SERVICE REQUEST message and completion of the EMM common procedures and, if any, in case that the CONTROL PLANE SERVICE REQUEST message was successfully integrity checked and the ESM message container or NAS message container in the CONTROL PLANE SERVICE REQUEST message, if applicable, was successfully deciphered, radio bearer establishment is not required, and the MME has downlink user data or signaling not related to an EMM common procedure pending. A fifth situation may be, with the transmission of a SERVICE ACCEPT message or with the decision to initiate release of the NAS signaling connection, if the CONTROL PLANE SERVICE REQUEST message was successfully integrity checked and the ESM message container or NAS message container in the CONTROL PLANE SERVICE REQUEST message, if applicable, was successfully deciphered, radio bearer establishment is not required, and the MME does not have any downlink user data or signaling pending. Under the proposed scheme, in case that the MME considers the service request procedure successfully completed, the MME may forward the contents of the ESM message container IE, if any, to the ESM layer. Additionally, the MME may forward the contents of the NAS message container IE, if any.

Under some of the proposed schemes described above, UE 110 may treat the receipt of any of the following as successful completion of the procedure: (i) a SECURITY MODE COMMAND message; (ii) a security protected EMM message different from a SERVICE REJECT message and not related to an EMM common procedure; (iii) a security protected ESM message; and (iv) an indication from the lower layers that the user plane radio bearers are set up. Upon successful completion of the procedure, UE 110 may reset the service request attempt counter, and UE 110 may stop the timer T3417 and enter the state of EMM-REGISTERED. It is noteworthy that a security protected EMM message may be, for example, a SERVICE ACCEPT message, and an ESM message may be an ESM DATA TRANSPORT message.

Under some of the proposed schemes described above, UE 110 may treat the indication from the lower layers that the user plane radio bearers are set up as successful completion of the procedure. Additionally, UE 110 may treat the receipt of a SERVICE ACCEPT message as completion of the procedure without the establishment of the user plane radio bearers. For both cases, UE 110 may reset the service request attempt counter, stop the timer T3417 and enter the state of EMM-REGISTERED. Under some of the proposed schemes described above, UE 110 may also treat the indication from the lower layers that a radio resource control (RRC) connection has been released as successful completion of the procedure. Moreover, UE 110 may reset the service request attempt counter, stop the timer T3417 and enter the state of EMM-REGISTERED. Under some of the proposed schemes described above, UE 110 may treat the indication from the lower layers that the RRC connection has been released as an abnormal case and may follow the procedure described above.

Under a ninth proposed scheme in accordance with the present disclosure, when a MUSIM UE (e.g., UE 110) in a CONTROL PLANE SERVICE REQUEST message sets a Request type to "NAS signaling connection release" or to "Rejection of paging" in a UE request type IE, the UE may treat the receipt of SERVICE ACCEPT message as the successful completion of the procedure. Additionally, the UE may reset the service request attempt counter, stop a timer T3417, enter the state of EMM-REGISTERED and not deactivate EPS bearer contexts locally.

Under a tenth proposed scheme in accordance with the present disclosure, UE 110 may treat the receipt of a SERVICE ACCEPT message as the successful completion of the procedure. Moreover, UE 110 may reset the service request attempt counter, stop timer T3417, and enter the state of EMM-REGISTERED.

Under some of the proposed schemes described above, in case that the MME needs to initiate an EPS bearer context status synchronization or to provide UE 110 with one or more forbidden TAIs for the list of "forbidden tracking areas for roaming" IE or one or more forbidden TAIs for the list of "forbidden tracking areas for regional provision of service", UE 110 may receive a SERVICE ACCEPT message even after it received a SECURITY MODE COMMAND message or an indication from the lower layers that the user plane radio bearers are set up and determined successful completion of the service request procedure. Upon receipt of the SECURITY MODE COMMAND message or an indication from the lower layers that the user plane radio bearers are set up, UE 110 may start a timer T3449. In case that UE 110 receives a security protected ESM message or a security protected EMM message not related to an EMM common procedure, UE 110 may stop the timer T3449. In case that UE 110 receives a SERVICE ACCEPT message while the timer T3449 is running, UE 110 may treat the SERVICE ACCEPT message and stop the timer T3449. In case that UE 110 is not in the state EMM-SERVICE-REQUEST-INITIATED and timer T3449 is not running, the receipt of the SERVICE ACCEPT message may be considered as protocol error and UE 110 may return or reply with an EMM STATUS message. Otherwise, UE 110 may treat the SERVICE ACCEPT message.

Under some of the proposed schemes described above, in case that UE 110 treats the SERVICE ACCEPT message and an EPS bearer context status IE as being included in the message, UE 110 may deactivate all those EPS bearers contexts locally (without peer-to-peer signaling between UE 110 and the MME) which are active in UE 110, but are indicated by the MME as being inactive. In case that a default EPS bearer context is marked as inactive in the EPS bearer context status IE included in the SERVICE ACCEPT message, and this default bearer is not associated with the last remaining PDN connection in UE 110, UE 110 may locally deactivate all EPS bearer contexts associated to the PDN connection with the default EPS bearer context without peer-to-peer ESM signaling to the MME. In case that the default bearer is associated with the last remaining PDN connection of UE 110 in the MME, and EMM-REGISTERED without PDN connection is supported by UE 110 and the MME, UE 110 may locally deactivate all EPS bearer contexts associated to the PDN connection with the default EPS bearer context without peer-to-peer ESM signaling to the MME.

Under an eleventh proposed scheme in accordance with the present disclosure, in case that UE 110 treats a SERVICE ACCEPT message, receives one or more forbidden TAIs for the list of "forbidden tracking areas for roaming" IE in the SERVICE ACCEPT message, and UE 110 is operating in satellite E-UTRAN access, the UE 110 may store the TAI(s) included in the IE into the list of "forbidden tracking areas for roaming", if not already stored. Additionally, UE 110 may remove the TAI(s) from the stored TAI list, if present. Under the proposed scheme, in case that UE 110 treats the SERVICE ACCEPT message, receives one or more forbidden TAIs for the list of "forbidden tracking areas for regional provision of service" IE in the SERVICE ACCEPT message and UE 110 is operating in satellite E-UTRAN access, then UE 110 may store the TAI(s) included in the IE into the list of "forbidden tracking areas for regional provision of service", if not already stored. Moreover, UE 110 may remove the TAI(s) from the stored TAI list, if present. In case that a T3448 value IE is present in the received SERVICE ACCEPT message, UE may perform certain operations including: (a) stopping timer T3448 if it is running; (b) considering the transport of user data via the control plane as successful; and (c) starting timer T3448 with the value provided in the T3448 value IE.

It is noteworthy that, in case that UE 110 is using EPS services with control plane CIoT EPS optimization, in case the T3448 value IE is present in the SERVICE ACCEPT message and the value indicates that this timer is either zero or deactivated, UE 110 may consider this case as an abnormal case and proceed as if the T3448 value IE is not present. Furthermore, in case that UE 110 in EMM-IDLE mode initiated the service request procedure by sending a CONTROL PLANE SERVICE REQUEST message and the SERVICE ACCEPT message does not include the T3448 value IE and if timer T3448 is running, then UE 110 may stop timer T3448.

In view of the above, certain key features of the various proposed schemes in accordance with the present disclosure are highlighted below.

In one aspect, an EPS network apparatus (e.g., network node 125), upon receipt of a CONTROL PLANE SERVICE REQUEST message from UE 110, and in case that the EPS network apparatus determines a need to provide UE 110 with one or more forbidden TAIs for a list of "forbidden tracking areas for roaming," one or more forbidden TAIs for a list of "forbidden tracking areas for regional provision of service," or both, the EPS network apparatus may send a SERVICE ACCEPT message to UE 110.

In one aspect, upon receiving a SERVICE ACCEPT message from wireless network 120 with the message including one or more forbidden TAIs for a list of "forbidden tracking areas for roaming" IE, one or more forbidden TAIs a the list of "forbidden tracking areas for regional provision of service" IE, or both IEs, and in case of UE 110 determining that a timer T3449 is still running, UE 110 may treat the received SERVICE ACCEPT message. Moreover, in response to one or more predefined criteria having been fulfilled, UE 110 may store received TAI values in the one or more forbidden TAIs for the list of "forbidden tracking areas for roaming" IE or the one or more forbidden TAIs for the list of "forbidden tracking areas for regional provision of service" IE, if not already stored. In some implementations, one of the one or more predefined criteria may be that UE 110 treats received IEs upon determining that UE 110 is operating in a satellite E-UTRAN access cell. In some implementations, one of the one or more predefined criteria may be that UE 110 determines that the satellite E-UTRAN access cell, in which the UE is operating, is broadcasting multiple TAC values for a selected PLMN.

In one aspect, an EPS network apparatus (e.g., network node 125), upon receipt of a CONTROL PLANE SERVICE REQUEST message from UE 110, and in response of the network apparatus determining a need to provide UE 110 with one or more forbidden TAIs for a list of "forbidden tracking areas for roaming" or one or more forbidden TAIs a the list of "forbidden tracking areas for regional provision of service", the EPS network apparatus may include the list of "forbidden tracking areas for roaming", the list of "forbidden tracking areas for regional provision of service", or both, in a message (e.g., SECURITY MODE COMMAND message) that the EPS network apparatus sends to UE 110 during a service procedure.

In one aspect, during a service procedure upon receiving from wireless network 120 a message including a list of "forbidden tracking areas for roaming", a list of "forbidden tracking areas for regional provision of service", or both, and upon determining that a timer T3449 is still running, UE 110 may treat the received message. Moreover, in response to one or more pr-defined criteria having been fulfilled, UE 110 may store received TAI values in one or more forbidden TAIs for a list of "forbidden tracking areas for roaming" IE or one or more forbidden TAIs for a list of "forbidden tracking areas for regional provision of service" IE, if not already stored. In some implementations, one of the one or more predefined criteria may be that UE 110 treats received IEs upon determining that UE 110 is operating in a satellite E-UTRAN access cell. In some implementations, one of the one or more predefined criteria may be that UE 110 determines that the satellite E-UTRAN access cell, in which the UE is operating, is broadcasting multiple TAC values for a selected PLMN.

Illustrative Implementations

FIG. 2 illustrates an example communication system 200 having at least an example apparatus 210 and an example apparatus 220 in accordance with an implementation of the present disclosure. Each of apparatus 210 and apparatus 220 may perform various functions to implement schemes, techniques, processes and methods described herein pertaining to UE handling of forbidden TAI list IEs in an EPS SERVICE ACCEPT message in mobile communications, including the various schemes described above with respect to various proposed designs, concepts, schemes, systems and methods described above, including network environment 100, as well as processes described below.

Each of apparatus 210 and apparatus 220 may be a part of an electronic apparatus, which may be a network apparatus or a UE (e.g., UE 110), such as a portable or mobile apparatus, a wearable apparatus, a vehicular device or a vehicle, a wireless communication apparatus or a computing apparatus. For instance, each of apparatus 210 and apparatus 220 may be implemented in a smartphone, a smart watch, a personal digital assistant, an electronic control unit (ECU) in a vehicle, a digital camera, or a computing equipment such as a tablet computer, a laptop computer or a notebook computer. Each of apparatus 210 and apparatus 220 may also be a part of a machine type apparatus, which may be an IoT apparatus such as an immobile or a stationary apparatus, a home apparatus, a roadside unit (RSU), a wire communication apparatus or a computing apparatus. For instance, each of apparatus 210 and apparatus 220 may be implemented in a smart thermostat, a smart fridge, a smart door lock, a wireless speaker or a home control center. When implemented in or as a network apparatus, apparatus 210 and/or apparatus 220 may be implemented in an eNodeB in an LTE, LTE-Advanced or LTE-Advanced Pro network or in a gNB or TRP in a 5G network, an NR network or an IoT network.

In some implementations, each of apparatus 210 and apparatus 220 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. In the various schemes described above, each of apparatus 210 and apparatus 220 may be implemented in or as a network apparatus or a UE. Each of apparatus 210 and apparatus 220 may include at least some of those components shown in FIG. 2 such as a processor 212 and a processor 222, respectively, for example. Each of apparatus 210 and apparatus 220 may further include one or more other components not pertinent to the proposed scheme of the present disclosure (e.g., internal power supply, display device and/or user interface device), and, thus, such component(s) of apparatus 210 and apparatus 220 are neither shown in FIG. 2 nor described below in the interest of simplicity and brevity.

In one aspect, each of processor 212 and processor 222 may be implemented in the form of one or more single-core processors, one or more multi-core processors, or one or more CISC or RISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including those pertaining to UE handling of forbidden TAI list IEs in an EPS SERVICE ACCEPT message in mobile communications in accordance with various implementations of the present disclosure.

In some implementations, apparatus 210 may also include a transceiver 216 coupled to processor 212. Transceiver 216 may be capable of wirelessly transmitting and receiving data. In some implementations, transceiver 216 may be capable of wirelessly communicating with different types of wireless networks of different radio access technologies (RATs). In some implementations, transceiver 216 may be equipped with a plurality of antenna ports (not shown) such as, for example, four antenna ports. That is, transceiver 216 may be equipped with multiple transmit antennas and multiple receive antennas for multiple-input multiple-output (MIMO) wireless communications. In some implementations, apparatus 220 may also include a transceiver 226 coupled to processor 222. Transceiver 226 may include a transceiver capable of wirelessly transmitting and receiving data. In some implementations, transceiver 226 may be capable of wirelessly communicating with different types of UEs/wireless networks of different RATs. In some implementations, transceiver 226 may be equipped with a plurality of antenna ports (not shown) such as, for example, four antenna ports. That is, transceiver 226 may be equipped with multiple transmit antennas and multiple receive antennas for MIMO wireless communications.

In some implementations, apparatus 210 may further include a memory 214 coupled to processor 212 and capable of being accessed by processor 212 and storing data therein. In some implementations, apparatus 220 may further include a memory 224 coupled to processor 222 and capable of being accessed by processor 222 and storing data therein. Each of memory 214 and memory 224 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 214 and memory 224 may include a type of read-only memory (ROM) such as mask ROM, programmable ROM (PROM), erasable programmable ROM (EPROM) and/or electrically erasable programmable ROM (EEPROM). Alternatively, or additionally, each of memory 214 and memory 224 may include a type of non-volatile random-access memory (NVRAM) such as flash memory, solid-state memory, ferroelectric RAM (FeRAM), magnetoresistive RAM (MRAM) and/or phase-change memory. Alternatively, or additionally, each of memory 214 and memory 224 may include a U ICC.

Each of apparatus 210 and apparatus 220 may be a communication entity capable of communicating with each other using various proposed schemes in accordance with the present disclosure. For illustrative purposes and without limitation, a description of capabilities of apparatus 210, as a UE (e.g., UE 110), and apparatus 220, as a network node (e.g., terrestrial network node 125 or non-terrestrial network node 128) of a wireless network (e.g., wireless network 120), is provided below.

Under certain proposed schemes in accordance with the present disclosure with respect to UE handling of forbidden TAI list IEs in an EPS SERVICE ACCEPT message in mobile communications, processor 212 of apparatus 210, implemented in or as UE 110, may transmit, via transceiver 216, a CONTROL PLANE SERVICE REQUEST message to an EPS network node (e.g., apparatus 220) of a wireless network (e.g., wireless network 120). Additionally, processor 212 may receive, via transceiver 216, a SERVICE ACCEPT message from the EPS network node responsive to the transmitting. The SERVICE ACCEPT message may include either or both of the following: (i) one or more forbidden TAIs for a list of "forbidden tracking areas for roaming" IE; and (ii) one or more forbidden TAIs for a list of "forbidden tracking areas for regional provision of service" IE.

In some implementations, in receiving the SERVICE ACCEPT message, processor 212 may receive the SERVICE ACCEPT message from the EPS network node in an event that the EPS network node determines a need to provide apparatus 210 with either or both of: (a) one or more forbidden TAIs for a list of "forbidden tracking areas for roaming"; and (b) one or more forbidden TAIs for a list of "forbidden tracking areas for regional provision of service".

In some implementations, processor 212 may also treat the received SERVICE ACCEPT message responsive to determining that a T3449 timer is still running.

In some implementations, processor 212 may also store, in memory 214, one or more TAI values of either or both of the one or more forbidden TAIs for the list of "forbidden tracking areas for roaming" IE and the one or more forbidden TAIs for the list of "forbidden tracking areas for regional provision of service" IE responsive to determining that at least one of one or more predefined criteria having been fulfilled. In some implementations, the at least one of the of one or more predefined criteria may involve treating one or more received IEs upon determining that apparatus 210 is operating in a satellite E-UTRAN access cell. Alternatively, the at least one of the of one or more predefined criteria may involve determining that a satellite E-UTRAN access cell, in which apparatus 210 is operating, is broadcasting multiple TAC values for a selected PLMN.

Under other proposed schemes in accordance with the present disclosure with respect to UE handling of forbidden TAI list IEs in an EPS SERVICE ACCEPT message in mobile communications, processor 212 of apparatus 210, implemented in or as UE 110, may transmit, via transceiver 216, a CONTROL PLANE SERVICE REQUEST message to an EPS network node (e.g., apparatus 220) of a wireless network (e.g., wireless network 120). Moreover, processor 212 may receive, via transceiver 216, a message from the EPS network node during a service procedure responsive to the transmitting. The message may include either or both of the following: (i) a list of "forbidden tracking areas for roaming"; and (ii) a list of "forbidden tracking areas for regional provision of service".

In some implementations, the message may include a SECURITY MODE COMMAND message.

In some implementations, in receiving the message, processor 212 may receive the message from the EPS network node in an event that the EPS network node determines a need to provide the UE with either or both of the following: (a) one or more forbidden TAIs for the list of "forbidden tracking areas for roaming"; and (b) one or more forbidden TAIs for the list of "forbidden tracking areas for regional provision of service".

In some implementations, processor 212 may also treat the received message responsive to determining that a T3449 timer is still running.

In some implementations, processor 212 may also store, in memory 214, one or more TAI values of either or both of one or more forbidden TAIs for the list of "forbidden tracking areas for roaming" and one or more forbidden TAIs for the list of "forbidden tracking areas for regional provision of service" responsive to determining that at least one of one or more predefined criteria having been fulfilled. In some implementations, the at least one of the of one or more predefined criteria may involve treating one or more received IEs upon determining that apparatus 210 is operating in a satellite E-UTRAN access cell. Alternatively, the at least one of the of one or more predefined criteria may involve determining that a satellite E-UTRAN access cell, in which apparatus 210 is operating, is broadcasting multiple TAC values for a selected PLMN.

Illustrative Processes

FIG. 3 illustrates an example process 300 in accordance with an implementation of the present disclosure. Process 300 may represent an aspect of implementing various proposed designs, concepts, schemes, systems and methods described above, whether partially or entirely, including those described above. More specifically, process 300 may represent an aspect of the proposed concepts and schemes pertaining to UE handling of forbidden TAI list IEs in an EPS SERVICE ACCEPT message in mobile communications. Process 300 may include one or more operations, actions, or functions as illustrated by one or more of blocks 310 and 320. Although illustrated as discrete blocks, various blocks of process 300 may be divided into additional blocks, combined into fewer blocks, or eliminated, depending on the desired implementation. Moreover, the blocks/sub-blocks of process 300 may be executed in the order shown in FIG. 3 or, alternatively in a different order. Furthermore, one or more of the blocks/sub-blocks of process 300 may be executed iteratively. Process 300 may be implemented by or in apparatus 210 and apparatus 220 as well as any variations thereof. Solely for illustrative purposes and without limiting the scope, process 300 is described below in the context of apparatus 210 as a UE (e.g., UE 110) and apparatus 220 as a communication entity such as a network node or base station (e.g., terrestrial network node 125 or non-terrestrial network node 128) of a network (e.g., wireless network 120). Process 300 may begin at block 310.

At 310, process 300 may involve processor 212 of apparatus 210, implemented in or as UE 110, transmitting, via transceiver 216, a CONTROL PLANE SERVICE REQUEST message to an EPS network node (e.g., apparatus 220) of a wireless network (e.g., wireless network 120). Process 300 may proceed from 310 to 320.

At 320, process 300 may involve processor 212 receiving, via transceiver 216, a SERVICE ACCEPT message from the EPS network node responsive to the transmitting. The SERVICE ACCEPT message may include either or both of the following: (i) one or more forbidden TAIs for a list of "forbidden tracking areas for roaming" IE; and (ii) one or more forbidden TAIs for a list of "forbidden tracking areas for regional provision of service" IE.

In some implementations, in receiving the SERVICE ACCEPT message, process 300 may involve processor 212 receiving the SERVICE ACCEPT message from the EPS network node in an event that the EPS network node determines a need to provide apparatus 210 with either or both of: (a) one or more forbidden TAIs for a list of "forbidden tracking areas for roaming"; and (b) one or more forbidden TAIs for a list of "forbidden tracking areas for regional provision of service".

In some implementations, process 300 may further involve processor 212 treating the received SERVICE ACCEPT message responsive to determining that a T3449 timer is still running.

In some implementations, process 300 may further involve processor 212 storing, in memory 214, one or more TAI values of either or both of the one or more forbidden TAIs for the list of "forbidden tracking areas for roaming" IE and the one or more forbidden TAIs for the list of "forbidden tracking areas for regional provision of service" IE responsive to determining that at least one of one or more predefined criteria having been fulfilled. In some implementations, the at least one of the of one or more predefined criteria may involve treating one or more received IEs upon determining that apparatus 210 is operating in a satellite E-UTRAN access cell. Alternatively, the at least one of the of one or more predefined criteria may involve determining that a satellite E-UTRAN access cell, in which apparatus 210 is operating, is broadcasting multiple TAC values for a selected PLMN.

FIG. 4 illustrates an example process 400 in accordance with an implementation of the present disclosure. Process 400 may represent an aspect of implementing various proposed designs, concepts, schemes, systems and methods described above, whether partially or entirely, including those described above. More specifically, process 400 may represent an aspect of the proposed concepts and schemes pertaining to UE handling of forbidden TAI list IEs in an EPS SERVICE ACCEPT message in mobile communications. Process 400 may include one or more operations, actions, or functions as illustrated by one or more of blocks 410 and 420. Although illustrated as discrete blocks, various blocks of process 400 may be divided into additional blocks, combined into fewer blocks, or eliminated, depending on the desired implementation. Moreover, the blocks/sub-blocks of process 400 may be executed in the order shown in FIG. 4 or, alternatively in a different order. Furthermore, one or more of the blocks/sub-blocks of process 400 may be executed iteratively. Process 400 may be implemented by or in apparatus 210 and apparatus 220 as well as any variations thereof. Solely for illustrative purposes and without limiting the scope, process 400 is described below in the context of apparatus 210 as a UE (e.g., UE 110) and apparatus 220 as a communication entity such as a network node or base station (e.g., terrestrial network node 125 or non-terrestrial network node 128) of a network (e.g., wireless network 120). Process 400 may begin at block 410.

At 410, process 400 may involve processor 212 of apparatus 210, implemented in or as UE 110, transmitting, via transceiver 216, a CONTROL PLANE SERVICE REQUEST message to an EPS network node (e.g., apparatus 220) of a wireless network (e.g., wireless network 120). Process 400 may proceed from 410 to 420.

At 420, process 400 may involve processor 212 receiving, via transceiver 216, a message from the EPS network node during a service procedure responsive to the transmitting. The message may include either or both of the following: (i) a list of "forbidden tracking areas for roaming"; and (ii) a list of "forbidden tracking areas for regional provision of service".

In some implementations, the message may include a SECURITY MODE COMMAND message.

In some implementations, in receiving the message, process 400 may involve processor 212 receiving the message from the EPS network node in an event that the EPS network node determines a need to provide the UE with either or both of the following: (a) one or more forbidden TAIs for the list of "forbidden tracking areas for roaming"; and (b) one or more forbidden TAIs for the list of "forbidden tracking areas for regional provision of service".

In some implementations, process 400 may further involve processor 212 treating the received message responsive to determining that a T3449 timer is still running.

In some implementations, process 400 may further involve processor 212 storing, in memory 214, one or more TAI values of either or both of one or more forbidden TAIs for the list of "forbidden tracking areas for roaming" and one or more forbidden TAIs for the list of "forbidden tracking areas for regional provision of service" responsive to determining that at least one of one or more predefined criteria having been fulfilled. In some implementations, the at least one of the of one or more predefined criteria may involve treating one or more received IEs upon determining that apparatus 210 is operating in a satellite E-UTRAN access cell. Alternatively, the at least one of the of one or more predefined criteria may involve determining that a satellite E-UTRAN access cell, in which apparatus 210 is operating, is broadcasting multiple TAC values for a selected PLMN.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   transmitting, by a processor of a user equipment (UE), a CONTROL PLANE SERVICE REQUEST message to an Evolved Packet Service (EPS) network node of a wireless network;
   receiving, by the processor, a SERVICE ACCEPT message from the EPS network node responsive to the transmitting, the SERVICE ACCEPT message comprising either or both of:
     one or more forbidden tracking area identifiers (TAIs) for a list of "forbidden tracking areas for roaming" information element (IE); and
     one or more forbidden TAIs for a list of "forbidden tracking areas for regional provision of service" IE; and
   storing, by the processor, one or more TAI values of either or both of the one or more forbidden TAIs for the list of "forbidden tracking areas for roaming" IE and the one or more forbidden TAIs for the list of "forbidden tracking areas for regional provision of service" IE responsive to determining that at least one of one or more predefined criteria having been fulfilled.

2. The method of claim 1, wherein the receiving of the SERVICE ACCEPT message comprises receiving the SERVICE ACCEPT message from the EPS network node in an event that the EPS network node determines a need to provide the UE with either or both of:
   one or more forbidden TAIs for a list of "forbidden tracking areas for roaming"; and
   one or more forbidden TAIs for a list of "forbidden tracking areas for regional provision of service".

3. The method of claim 2, further comprising:
   treating, by the processor, the received SERVICE ACCEPT message responsive to determining that a T3449 timer is still running.

4. The method of claim 1, wherein the at least one of the of one or more predefined criteria comprises treating one or more received IEs upon determining that the UE is operating in a satellite Evolved Universal Mobile Telecommunications System (UMTS) Radio Access Network (E-UTRAN) access cell.

5. The method of claim 1, wherein the at least one of the of one or more predefined criteria comprises determining that a satellite Evolved Universal Mobile Telecommunications System (UMTS) Radio Access Network (E-UTRAN) access cell, in which the UE is operating, is broadcasting multiple tracking area code (TAC) values for a selected public land mobile network (PLMN).

6. A method, comprising:
   transmitting, by a processor of a user equipment (UE), a CONTROL PLANE SERVICE REQUEST message to an Evolved Packet Service (EPS) network node of a wireless network;
   receiving, by the processor, a message from the EPS network node during a service procedure responsive to the transmitting, the message comprising either or both of:
      a list of "forbidden tracking areas for roaming"; and
      a list of "forbidden tracking areas for regional provision of service"; and
   storing, by the processor, one or more tracking area identifier (TAI) values of either or both of one or more forbidden TAIs for the list of "forbidden tracking areas for roaming" and one or more forbidden TAIs for the list of "forbidden tracking areas for regional provision of service" responsive to determining that at least one of one or more predefined criteria having been fulfilled.

7. The method of claim 6, wherein the message comprises a SECURITY MODE COMMAND message.

8. The method of claim 6, wherein the receiving of the message comprises receiving the message from the EPS network node in an event that the EPS network node determines a need to provide the UE with either or both of:
   one or more forbidden TAIs for the list of "forbidden tracking areas for roaming"; and
   one or more forbidden TAIs for the list of "forbidden tracking areas for regional provision of service".

9. The method of claim 6, further comprising:
   treating, by the processor, the received message responsive to determining that a T3449 timer is still running.

10. The method of claim 6, wherein the at least one of the of one or more predefined criteria comprises treating one or more received information elements (IEs) upon determining that the UE is operating in a satellite Evolved Universal Mobile Telecommunications System (UMTS) Radio Access Network (E-UTRAN) access cell.

11. The method of claim 6, wherein the at least one of the of one or more predefined criteria comprises determining that a satellite Evolved Universal Mobile Telecommunications System (UMTS) Radio Access Network (E-UTRAN) access cell, in which the UE is operating, is broadcasting multiple tracking area code (TAC) values for a selected public land mobile network (PLMN).

12. An apparatus implementable in a user equipment (UE), comprising:
   a transceiver configured to communicate wirelessly; and
   a processor coupled to the transceiver and configured to perform, via the transceiver, operations comprising:
      transmitting a CONTROL PLANE SERVICE REQUEST message to an Evolved Packet Service (EPS) network node of a wireless network;
      receiving a message from the EPS network node responsive to the transmitting, the message comprising either or both of:
         one or more forbidden tracking area identifiers (TAIs) for a list of "forbidden tracking areas for roaming" information element (IE); and
         one or more forbidden TAIs for a list of "forbidden tracking areas for regional provision of service" IE; and
      storing one or more TAI values of either or both of the one or more forbidden TAIs for the list of "forbidden tracking areas for roaming" IE and the one or more forbidden TAIs for the list of "forbidden tracking areas for regional provision of service" IE responsive to determining that at least one of one or more predefined criteria having been fulfilled.

13. The apparatus of claim 12, wherein the message comprises a SERVICE ACCEPT message or a SECURITY MODE COMMAND message.

14. The apparatus of claim 12, wherein the receiving of the message comprises receiving the message from the EPS network node in an event that the EPS network node determines a need to provide the UE with either or both of:
   one or more forbidden TAIs for a list of "forbidden tracking areas for roaming"; and
   one or more forbidden TAIs for a list of "forbidden tracking areas for regional provision of service".

15. The apparatus of claim 12, wherein the processor is further configured to perform operations comprising:
   treating the received message responsive to determining that a T3449 timer is still running.

16. The apparatus of claim 12, wherein the at least one of the of one or more predefined criteria comprises treating one or more received IEs upon determining that the UE is operating in a satellite Evolved Universal Mobile Telecommunications System (UMTS) Radio Access Network (E-UTRAN) access cell.

17. The apparatus of claim 12, wherein the at least one of the of one or more predefined criteria comprises determining that a satellite Evolved Universal Mobile Telecommunications System (UMTS) Radio Access Network (E-UTRAN) access cell, in which the UE is operating, is broadcasting multiple tracking area code (TAC) values for a selected public land mobile network (PLMN).

* * * * *